Patented Aug. 11, 1931

1,818,108

UNITED STATES PATENT OFFICE

MAX JOSEPH THEUMANN, OF LYON, FRANCE, ASSIGNOR, BY MESNE ASSIGNMENTS, TO E. I. DU PONT DE NEMOURS AND COMPANY, OF WILMINGTON, DELAWARE, A CORPORATION OF DELAWARE

PROCESS OF MANUFACTURING CELLULOID-LIKE MASSES

No Drawing. Application filed July 3, 1926, Serial No. 120,536, and in Germany July 14, 1925.

This invention relates to a process of manufacturing a celluloid-like product, by the use of an acetone-soluble acetyl cellulose, the object of the invention being to provide a process by means of which the solvent maintains its original dissolving property throughout the operation.

If one tries to produce plastic celluloid-like masses from an acetone-soluble acetyl cellulose, by treatement with the mixture of ethyl alcohol and benzol suggested by Eichengrün (U. S. Patent No. 1,015,155) for the solution of the acetyl cellulose, it will be noted that the acetyl cellulose remains in solution only in the presence of heat and that it quickly separates out upon cooling off. This fact was ascertained by Eichengrün, and it was the precipitated mass which was used by him for the preparation of celluloid. It is true that Eichengrün states that this separation can be avoided by the addition of acetone. However, he did not use the solutions thus obtained for the production of celluloid, as the gelatinization, which is prevented by the addition of the acetone, seemed to him of particular value for this purpose.

With the present invention the difficulties which heretofore prevented the use of these solutions are avoided and celluloid is obtained of excellent quality. By treating the acetone-soluble acetyl cellulose with a mixture of acetone, benzol and fatty alcohol especially good results are obtained, if the proportion of materials is so selected that the volatile mixture retains its original solvent properties throughout the whole process. If this precaution is not taken however, the individual components evaporating at unequal speeds, the mixture which originally was capable of dissolving the acetyle cellulose loses this property. Consequently the acetyl cellulose finds itself in the presence of a volatile mixture lacking the required solvent capacity, which renders more difficult the making of the celluloid and particularly the molding thereof. The preparation of the celluloid is even rendered impossible if it is a question of a complicated structure, or if it is desired to produce a celluloid with a high acetate content. In every case the resulting product is of a very inferior grade, as the mass is not uniform and the separate layers do not unite very well. The invention is particularly applicable to an acetone-soluble acetyl cellulose, (which, however, is insoluble in ethyl acetate) which is, according to the experiments of the applicant, particularly suitable for the manufacture of celluloid.

This success is the more surprising as the acetone is the only real solvent of the mixture which has a lower boiling point than the other constituents. Therefore it was to be expected that first of all the acetone would evaporate and that the remaining mixture would no longer have the dissolving power required for a good working.

The process can be carried out, for instance, as follows:

Example 1

Knead 75 kilos of acetyl cellulose soluble in acetone but practically insoluble in ethyl acetate, with 50 kilos of a mixture consisting of:

33 parts by weight of acetone
52 parts by weight of benzol
14 parts by weight of ethyl alcohol and add 25 kilos of a camphor substitute
———
124

In this way one obtains quickly a transparent mass which can be filtered, rolled, pressed into blocks and cut.

Example 2

Knead 75 kilos of acetyl cellulose soluble in acetone but practically insoluble in ethyl acetate, with 50 kilos of a mixture consisting of:

48 parts by weight of acetone
32 parts by weight of benzol
20 parts by weight of methyl alcohol and add 25 kilos of a camphor substitute.

This mass is worked as stated under Example 1.

In these examples the quantity of the camphor substitute may be varied without in any way impairing the uniformity of the mass. In this way more or less hard products are obtained.

Having thus described my invention, what I claim is:

1. A process for the preparation of a celluloid-like mass from an acetone-soluble acetyl cellulose practically insoluble in ethyl acetate, which consists in treating the acetyl cellulose with a solvent mixture containing 33 to 48 parts by weight of acetone, 32 to 52 parts by weight of benzol and 14 to 20 parts by weight of an alcohol, the relative proportions by weight of acetyl cellulose and solvent mixture being approximately 75 and 50.

2. A process for the preparation of a celluloid-like mass from an acetone-soluble acetyl cellulose practically insoluble in ethyl acetate, which consists in treating the acetyl cellulose with a solvent mixture containing 33 to 48 parts by weight of acetone, 32 to 52 parts by weight of benzol and 14 to 20 parts by weight of an alcohol, the relative proportions by weight of acetyl cellulose and solvent mixture being approximately 75 and 50, the whole being mixed with a camphor substitute.

In testimony whereof I have signed my name to this specification.

MAX JOSEPH THEUMANN.